United States Patent Office 3,372,199
Patented Mar. 5, 1968

3,372,199
PROCESS FOR THE PRODUCTION OF
HYDROCINNAMALDEHYDE
Paul N. Rylander, Newark, and Nathan Himselstein, Hillside, N.J., assignors to Engelhard Industries, Inc., Newark, N.J., a corporation of Delaware
No Drawing. Filed Mar. 20, 1964, Ser. No. 353,615
1 Claim. (Cl. 260—599)

ABSTRACT OF THE DISCLOSURE

Aryl aldehydes having alpha, beta olefinic bonds, such as cinnamaldehyde, are hydrogenated to the corresponding aralkyl aldehyde using palladium catalyst and an iron promoter. The method provides the desired aldehydes under appropriate conditions to the virtual exclusion of corresponding alcohols.

---

This invention relates to the production of hydrocinnamaldehyde and more particularly to a new and improved process for the hydrogenation of the alpha, beta olefinic bond of cinnamaldehyde and/or its substitution derivatives to produce the corresponding hydrocinnamaldehyde.

Palladium per se has been utilized heretofore as catalyst for the hydrogenation of the alpha, beta olefinic bond of cinnamaldehyde to the corresponding saturated aldehydes. However, the palladium is not entirely satisfactory for catalyzing such hydrogenation for the reason it does not have the desired selectivity to the saturated aldehyde, with material amounts of reaction by-products being formed due to hydrogenation of the carbonyl double bond as well as the olefinic bond. Further the hydrogenation rate with the palladium per se as catalyst has left room for improvement. When platinum black was utilized as catalyst, cinnamaldehyde was hydrogenated with difficulty and the product was primarily cinnamyl alcohol.

In accordance with the present invention, we have found that the alpha, beta olefinic bond of cinnamaldehyde and/or its nuclear substitution derivatives is selectively hydrogenated to produce the corresponding hydrocinnamaldehyde and with a markedly higher selectivity to such saturated aldehyde than when using palladium per se as catalyst for the hydrogenation. Further the rate of hydrogenation of the cinnamaldehyde or substituted cinnamaldehyde is increased considerably over that obtained with the palladium per se as catalyst. The process of this invention involves contacting the cinnamaldehyde and/or its substitution derivative together with hydrogen with a palladium catalyst in the presence of an iron promoter. By reason of the palladium catalyst promoted with iron, there surprisingly and unexpectedly occurred a marked improvement in selectivity for the hydrogenation of the alpha, beta double bond with a spontaneous cessation of the reaction occurring after reaction of one molecular equivalent of $H_2$ to produce the corresponding saturated aldehyde. However, when ferrous chloride was added to the platinum catalyst, the major product was cinnamyl alcohol. A selectivity to the desired saturated aldehyde as high as 100% has been achieved by the present invention, and an increase in the hydrogenation rate as much as 300% over that obtained by a supported palladium by itself as catalyst.

The iron promoter of this invention is an iron salt of an inorganic or organic acid, for instance ferrous or ferric salts of strong mineral acids, e.g. ferrous chloride, ferrous sulfate, ferric chloride, etc., or a ferrous salt of an organic acid, e.g. ferrous salts of organic dicarboxylic acids, for instance ferrous oxalate, ferrous salts of hydroxy dicarboxylic acids, for instance ferrous tartrate, and ferrous salts of organic monocarboxylic acids, for instance ferrous salts or lower alkanoic monocarboxylic acids, e.g. ferrous acetate and ferrous propionate. The iron promoter can be on a solid catalyst support together with the palladium also on the support, or can be added as such to the reaction mixture containing the cinnamaldehyde and/or its substitution derivative in liquid phase and also containing the palladium catalyst.

The palladium content of the supported catalyst may range, by weight, from about 0.5%–20%, preferably from about 2%–10% (based on weight of support plus palladium). The iron promoter, for instance ferrous chloride, is preferably present in amount of from about 0.5–1.5 mols of such iron salt per mol of palladium. When the iron salt is supported on the carrier with the palladium, an aqueous solution of the iron salt is added to the solid supported palladium, followed by agitating the resulting mixture and then drying the product by heating same at a temperature not above 400° C., preferably between about 50° C. and 150° C. As exemplary, a catalyst of this invention was prepared by adding to 30 grams of a 5% palladium on carbon 70 ml. of a 0.2 M $FeCl_2$ aqueous solution. The resulting suspension was stirred thoroughly and dried in an oven by being heated therein at 100° C. for 24 hours. Alternatively instead of being substantially completely dried by means of the oven heating, the solids can be separated from the liquid, for instance by filtration, washed several times on the filter with the filtrate, and then only partially dried by drawing air through the catalyst on the filter, for instance for a period of 5–10 minutes.

Prior to the hydrogenation, the cinnamaldehyde and/or its ring substitution derivative is preferably admixed with an organic liquid diluent which is inert to the hydrogenation, such as methanol.

The hydrogenation of this invention is illustrated by the following equation when cinnamaldehyde per se is the compound being hydrogenated and $FeCl_2$ is the additive promoter for the Pd catalyst.

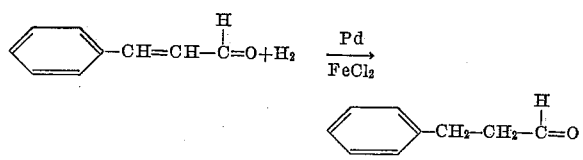

The hydrogen is preferably supplied to the reaction zone or chamber in a slight excess over the amount required to stoichiometrically react with the cinnamaldehyde to saturate its alpha, beta olefinic bond, typically a 5% excess of hydrogen.

Cinnamaldehydes which can be hydrogenated in accordance with the present invention include those of the formula

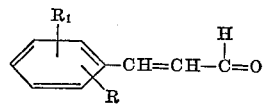

wherein R and $R_1$ are each from the group consisting of hydrogen, lower alkyl, i.e. 1–8 C alkyl, and lower alkoxy, i.e. 1–8 C alkoxy; of the formula

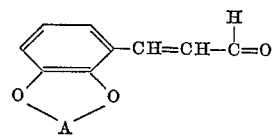

wherein A is lower alkylene, i.e. 1–3 C alkylene inclusive; and of the formula

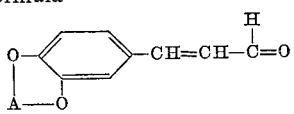

wherein A has the meaning stated supra.

Operating conditions for the hydrogenation of this invention are a temperature between room temperature and about 100° C., preferably room temperature. Pressures utilized are between about atmospheric pressure and about 1000 p.s.i.g. The hydrogenation can be carried out either in continuous or batchwise operation.

Exemplary of cinnamaldehydes which can be hydrogenated in accordance with this invention are cinnamaldehyde per se,
p-methoxycinnamaldehyde,
3,4-methylenedioxy-cinnamaldehyde,
2,3-methylenedioxy-cinnamaldehyde,
2,3-ethylenedioxy-cinnamaldehyde,
3,4-ethylenedioxy-cinnamaldehyde,
3-ethoxy-4-methoxy-cinnamaldehyde,
2-methoxy-3-methyl-cinnamaldehyde,
2-methoxy-4-ethyl-cinnamaldehyde,
3,5-dimethyl-cinnamaldehyde,
2,4-diethoxy-cinnamaldehyde,
2-methyl-4-butyl-cinnamaldehyde,
3-butoxy-4-methoxy-cinnamaldehyde,
o-methyl-cinnamaldehyde,
o-ethyl-cinnamaldehyde,
o-propyl-cinnamaldehyde,
o-butyl-cinnamaldehyde,
p-methyl-cinnamaldehyde,
p-ethyl-cinnamaldehyde,
p-propyl-cinnamaldehyde,
p-butyl-cinnamaldehyde,
m-propyl-cinnamaldehyde,
m-ethyl-cinnamaldehyde,
m-methyl-cinnamaldehyde,
m-butyl-cinnamaldehyde,
and so forth.

Products produced in accordance with the present process are hydrocinnamaldehyde with hydrogenation of cinnamaldehyde per se,
p-methoxyhydrocinnamaldehyde with hydrogenation of p-methoxy-cinnamaldehyde,
3,4-methylenedioxyhydrocinnamaldehyde with 3,4-methylenedioxy-cinnamaldehyde,
2,3-methylenedioxyhydrocinnamaldehyde with 2,3-methylenedioxy-cinnamaldehyde,
2,3-ethylenedioxyhydrocinnamaldehyde with 2,3-ethylenedioxy-cinnamaldehyde,
3,4-ethylenedioxyhydrocinnamaldehyde with 3,4-ethylenedioxy-cinnamaldehyde,
3-ethoxy-4-methoxy-hydrocinnamaldehyde with 3-ethoxy-4-methoxy-cinnamaldehyde,
2-methoxy-3-methyl-hydrocinnamaldehyde with 2-methoxy-3-methyl-cinnamaldehyde,
2-methoxy-4-ethyl-hydrocinnamaldehyde with 2-methoxy-4-ethyl-cinnamaldehyde,
3,5-dimethyl-hydrocinnamaldehyde with 3,5-dimethyl-cinnamaldehyde,
2,4-diethoxy-hydrocinnamaldehyde with 2,4-diethoxy-cinnamaldehyde,
2-methyl-4-butyl-hydrocinnamaldehyde with 2-methyl-4-butyl-cinnamaldehyde,
3-butoxy-4-methoxy-hydrocinnamaldehyde with 3-butoxy-4-methoxy-cinnamaldehyde,
o-methyl-hydrocinnamaldehyde with o-methyl-cinnamaldehyde,
o-ethyl-hydrocinnamaldehyde with o-ethyl-cinnamaldehyde,
o-propyl-hydrocinnamaldehyde with o-propyl-cinnamaldehyde,
o-butyl-hydrocinnamaldehyde with o-butyl-cinnamaldehyde,
p-methyl-hydrocinnamaldehyde with p-methyl-cinnamaldehyde,
p-ethyl-hydrocinnamaldehyde with p-methyl-cinnamaldehyde,
p-ethyl-hydrocinnamaldehyde with p-ethyl-cinnamaldehyde,
p-propyl-hydrocinnamaldehyde with p-propyl-cinnamaldehyde,
p-butyl-hydrocinnamaldehyde with p-butyl-cinnamaldehyde,
m-propyl-hydrocinnamaldehyde with m-propyl-cinnamaldehyde,
m-ethyl-hydrocinnamaldehyde with m-ethyl-cinnamaldehyde,
m-methyl hydrocinnamaldehyde with m-methyl-cinnamaldehyde,
m-butyl-hydrocinnamaldehyde with m-butyl-cinnamaldehyde,
and so forth.

Test runs were carried out for the purpose of comparing the use of palladium as catalyst in the presence and absence of a ferrous salt of this invention, for catalyzing the hydrogenation of cinnamaldehyde to hydrocinnamaldehyde. The hydrogenation was carried out in each run by first charging a mixture of 2 ml. of cinnamaldehyde and 100 ml. of methanol as diluent, and also 200 mg. of 5% Pd on carbon (equivalent to about .0001 mol Pd) to a hydrogenation reactor. For certain of the test runs ferrous chloride was added to the Pd on carbon prior to its introduction into the reactor. The reactor was placed in a shaker, the reactor evacuated of gases and filled with $H_2$ three times, and the shaker started. After the reaction stopped, the product was identified by infrared analysis. Cessation of the hydrogenation reaction was indicated by the level of the liquid in the gas measuring burette rising to a certain level therein and then remaining stationary, i.e. not rising or lowering. The results of the test runs are set forth in the following Table I:

TABLE I

| Test run No. | Additive to Pd/C | Time to total $H_2$ consumption (min.) | Total $H_2$ absorbed (ml.) | Percent selectivity to hydrocinnamaldehyde |
|---|---|---|---|---|
| 1 | None | 35 | 540 | 67 |
| 2 | 0.0001 mol $FeCl_2$ | 12 | 410 | 100 |
| 3 | 0.0001 mol $FeCl_2$ | 12 | 410 | 100 |
| 4 | 0.0001 mol $FeCl_2$ | 10 | 420 | 98 |
| 5 | None | 40 | 595 | 55 |
| 6 | 0.0001 mol $FeCl_2$ | 20 | 485 | 81 |
| 7 | 0.00013 mol $FeCl_2$ | 25 | 420 | 98 |
| 8 | 0.0001 mol $FeCl_2$ | 25 | 410 | 100 |
| 9 | 0.0001 mol $FeCl_2$ | 25 | 410 | 100 |
| 10 | 0.0001 mol $FeCl_2$ | 25 | 425 | 96 |
| 11 | 0.00011 mol $FeCl_2$ | 15 | 435 | 94 |
| 12 | 0.0001 mol $FeCl_2$ | 10 | 425 | 96 |
| 13 | 0.0001 mol $FeCl_2$ | 15 | 430 | 95 |
| 14 | None | 30 | 545 | 67 |
| 15 | 0.0001 mol $FeCl_2$ | 15 | 430 | 95 |
| 16 | None | 40 | 560 | 63 |
| 17 | 0.0001 mol $FeCl_2$ | 25 | 445 | 91 |
| 18 | 0.00011 mol $FeCl_2$ | 20 | 410 | 100 |

The test results of Table I show the presence of the iron salt together with the supported palladium to be superior to the supported Pd alone for the hydrogenation of cinnamaldehyde to hydrocinnamaldehyde from the standpoint of a considerably improved hydrogenation rate, and also a considerably improved selectivity to the desired product. In Table I, the "percent selectivity" is determined in accordance with the following:

Selectivity =

$$\frac{\text{Moles of Hydrocinnamaldehyde formed}}{\text{Moles Cinnamaldehyde reduced}} \times 100$$

Hydrocinnamaldehydes produced in accordance with this invention have utility in perfumery, i.e. as essential ingredients of perfumes. Certain of the hydrocinnamaldehydes, for instance, hydrocinnamicaldehyde, also have utility as flavors in food products.

What is claimed is:

1. A process for poducing hydrocinnamaldehyde which comprises contacting cinnamaldehyde at about room temperature with hydrogen at a pressure of about atmospheric pressure in methanol in the presence of supported palladium as catalyst and ferrous chloride as promoter in an amount of 0.5–1.5 moles per mole of palladium.

References Cited
UNITED STATES PATENTS

| | | | |
|---|---|---|---|
| 2,875,131 | 2/1959 | Carpenter et al. | 260—599 X |
| 2,976,321 | 3/1961 | Dorsky et al. | 260—599 |
| 3,280,192 | 10/1966 | Levy et al. | 260—599 |

OTHER REFERENCES

Shriner et al.: Jour. Amer. Chem. Soc., vol 46 (1924), pp. 1683–1693.

Tuley et al.: Jour. Amer. Chem. Soc., vol 47 (1925), pp. 3061–3068.

BERNARD HELFIN, *Primary Examiner.*